Jan. 1, 1935.  A. V. GROSSE  1,986,196

APPARATUS FOR CONDUCTING REACTIONS AT ELEVATED PRESSURES

Filed May 4, 1933

INVENTOR
ARISTID V. GROSSE
BY Frank L. Belknap
ATTORNEY

Patented Jan. 1, 1935

1,986,196

UNITED STATES PATENT OFFICE 1,986,196

APPARATUS FOR CONDUCTING REACTIONS AT ELEVATED PRESSURES

Aristid V. Grosse, Chicago, Ill., assignor to Universal Oil Products Company, Chicago, Ill., a corporation of Delaware Application May 4, 1933, Serial No. 669,453

11 Claims. (Cl. 23—290)

This invention relates to apparatus for use in processes operating under pressure and involving reactions between corrosive substances or substances affected catalytically by ordinary types of pressure equipment.

There are a great many important chemical processes which cannot be operated under pressure because the reacting materials cannot be used safely in ordinary high pressure apparatus or because the reactions are catalyzed in an undesirable manner by the material of which the equipment is constructed. Such material is practically always iron in the form of steel or ferrous alloys which are not sufficiently resistant to corrosive influences, particularly in the case of the more highly corrosive chemicals, and which frequently exert a pronounced catalytic influence.

On the other hand, materials which are corrosion-resistant and essentially non-catalytic are generally unsuitable for use in the construction of high pressure vessels on account of certain undesirable physical properties such as lack of tensile strength, brittleness and the tendency to "creep" on continued use at high temperatures.

As a rule, therefore, high pressure reactions with corrosive chemicals are rarely attempted outside of small scale laboratory apparatus where small quantities of corrosive materials are reacted in glass and silica tubes. Even here there is considerable hazard due to possible explosions which must be guarded against constantly and in the case of extremely high pressures the tubes or bombs must be very minute.

The present invention enables the safe and controllable carrying out of reactions between corrosive compounds at elevated pressures and elevated temperatures if a material is available which is at all resistant to the chemicals employed even if it has at the same time inferior quality in respect to physical properties, particularly tensile strength. The invention involves the use of the slow diffusion rate of gases or vapors through capillaries under light to moderate differential pressures.

In one specific embodiment the invention comprises the use of corrosion-resistant inner vessels or liners in reaction vessels intended for high pressure operation, the inner space of the liner being in open connection with the space between the bomb and the liner through restricted passageways such as capillaries or thin annular spaces so that excessive diffusion of corrosive reactants or products into contact with the pressure container is prevented.

The invention further comprises the use of substantially neutral gas in the space between the liner and the pressure vessel.

In operation, corrosive chemicals or chemicals which develop corrosive products in their reaction are charged to the inner corrosion-resistant vessel or liner which is placed in the bomb, the bomb then closed and preferably an inert gas or one which is utilized in the reaction but is not corrosive upon the pressure vessel, is added to the space between the liner and the pressure vessel. The bomb may then be heated to induce the desired reactions which causes development of pressure inside the apparatus, but owing to the use of the inert gas and the capillaries, there is a balancing of pressure between the liner and the bomb space so that no tension or compressive strains are produced in the liner and there is a practical minimum of corrosive action upon the pressure vessel due to escape of corrosive materials from the inner vessel.

It is a feature of the invention that inert gases may be continuously introduced under pressure between the liner and the bomb as volatile materials are evolved from the reaction with or without heating so that the pressure created by the evolution of volatile products is counter-balanced and there is no strain induced in the liner which can thus be made with relatively thin walls to save expense in the case of more costly materials.

As a modification of the above procedure fluids may be placed in the space between the liner and the pressure vessel which develop sufficient vapor pressure as the bomb is heated and the reactions proceed, to approximately counter-balance the pressure developed inside the liner, the retardation of diffusion by the capillary connection assisting in this counter-balancing effect.

The invention is further characterized in that it is possible to more closely control the catalytic effects frequently exerted by the walls of the pressure containers.

In the attached drawing the essential details of the types of apparatus which may be employed within the scope of the invention are shown though the invention is not limited to the particular details of the construction indicated.

With reference to the drawing, Fig. 1 shows an arrangement of a pressure bomb containing a corrosion-resistant inner liner in which reactions may be carried out according to the invention.

Figure 1:
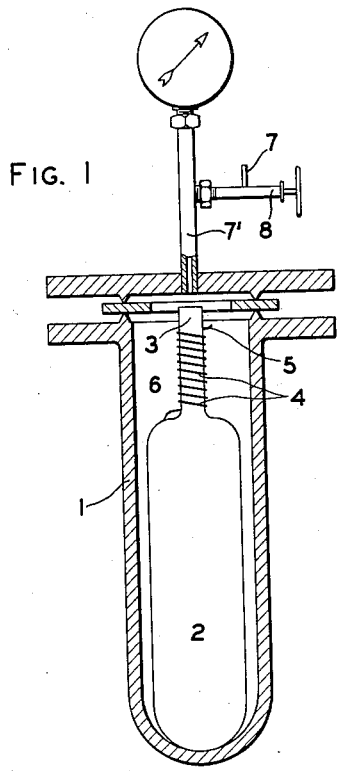

The pressure vessel 1 may be made of steel and the inserted vessel or liner 2 may be made of corrosion-resistant metal. The reacting materials which may be liquids or solids or both may be introduced through the pipe 3 which is then preferably closed by fusion or the insertion of a ground and faced connection or by any other suitable means. 4 indicates the capillary through which connection to the inner space 6 of the pressure vessel is made, the end of this capillary being shown at 5.

With this particular setup any of the alternative modes of procedure may be followed which have been mentioned previously. For example, inert gas may be introduced through the outside pipe 7 through angle valve 8 and pipe 7' to build up a pressure in space 6 as volatile products are evolved from the reaction in container 2 and slowly diffuse through the capillary. Similarly, an inert liquid such as a selected oil may be introduced into space 6, this oil developing pressure upon heating which counter-balances pressure of materials produced by the reaction in the corrosion-resistant container. It is important to note that the rate of diffusion of volatile reaction products into the intermediate space 6 may be readily controlled or completely prevented because the flow of fluids through capillaries decreases with great rapidity as the length of the capillaries is increased or the radius is decreased. The general law of fluid flow in capillaries is that it is inversely proportional to the length of the capillary and directly proportional to the fourth power of the capillary radius. Thus, by suitably diminishing capillaries, using longer and/or narrower capillaries for more volatile substances and shorter and/or wider capillaries for less volatile, a sufficient control of diffusion may be insured.

Figure 2:
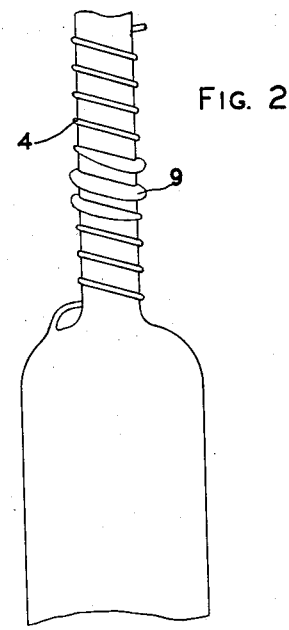
Fig. 2 shows the neck and the upper portion of the inner vessel of Fig. 1 somewhat enlarged.

In the case of reactions which are difficult to control on account of extremely sudden variations in pressure, a capillary may not be entirely sufficient to prevent the evolution of corrosive vapors into space 6 in which case the capillary may contain along its length enlarged or expanded portions as indicated at 9 in Fig. 2, these larger sections acting as a trap to entrain any liquid material which may be thrown over and to give an equivalent of greater capacity to the capillary.

It may be advantageous in some cases to use a plurality of capillaries, especially in connection with large size vessels because of the greater possibilities of adaptation to space requirements and mechanical construction. Furthermore, blow-off or safety valves of corrosion-resistant material may also be employed in conjunction with the capillaries if sudden or explosive developments of pressure are to be feared.

Figure 3:
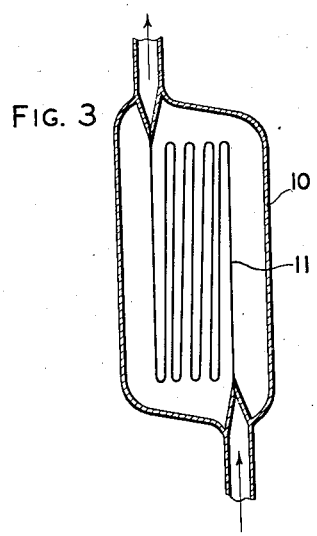
Fig. 3 shows a particular capillary arrangement.

The type of capillary which may be employed is not limited to the spiral forms indicated in Figs. 1 and 2 but it may also be of a relatively flat cross-section and arranged in zig-zag or any other form when necessary or desirable from a standpoint of suspension or mechanical reenforcement. For instance, capillaries may be arranged in the various designs commonly used in the filaments in incandescent electric lights. Fig. 3 represents an arrangement of this character in which a relatively long capillary 11 is suspended in a bulb 10, the capillary being arranged in a solenoid form and the bulb being an integral portion of the inner corrosion-resistant liner 2 as shown in Fig. 1.

Figure 4:
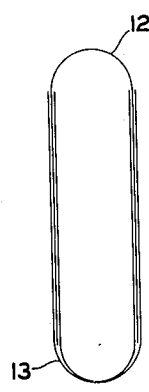
Fig. 4 shows the utilization of thin annular spaces instead of capillaries.

Fig. 4 shows in cross-section the construction of an interior vessel in which close fitting capsular sections 12 and 13 are used, the latter being double walled so that any material which may tend to be evolved from the reactions taking place in the inner capsule will have to traverse two thin annular spaces in succession to reach the space 6 generally indicated as lying between the inner vessel and the outside vessel in Fig. 1.

Figure 5:
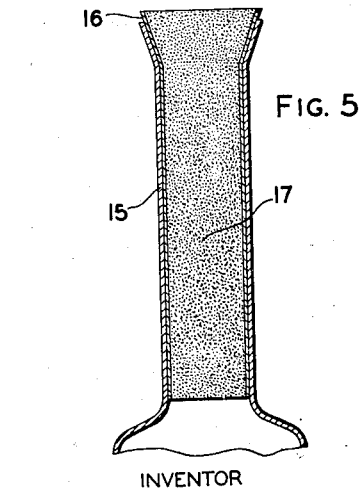
Fig. 5 shows the use of a porous plug in the neck of flasks indicated generally as 2 in Fig. 1.

In addition to the use of capillaries and narrow annular spaces use may be made of filling material of a corrosion-resistant character such as glass or porcelain wool, finely divided coke or carbon, metal powders, silica dust, etc. Composite porous fillers or plugs may be made by compression in suitable patterns, these being inserted into inter-connecting tubes of more microscopic dimensions. Such an arrangement is shown in Fig. 5, a plug of porous material 17 being contained in a shell 16 which fits closely in the neck 15 of the inner vessel. The retarded diffusion rate through this porous plug is analogous to that produced by the use of capillaries.

It is to be understood that any type of materials may be used for the inner vessel or the capillary connections such as, for example, glass, quartz, alloys and the more expensive metals such as silver, gold, platinum, etcetera, also any of the corrosion-resistant alloys which have been developed commercially in recent years. Although the apparatus has thus far been described solely in connection with batch operation, the same principles may be employed in continuous operations. Thus, in some cases vaporous products of the reactions may be vented at intervals and further quantities of reactants introduced until the capacity of the inner container is reached. Similarly, by an arrangement of double connections both gases and liquids may be separately and continuously introduced and withdrawn, for example, when the reaction apparatus is in the form of relatively long horizontal tubes. It is further comprised within the scope of the invention to utilize in the connecting space such as the capillaries or the porous plugs already mentioned suitable absorbing or neutralizing materials which avoid all possibilities of the contact of corrosive reaction products with the inner walls of the pressure vessel.

As examples of corrosive materials which may be employed with safety when operating in accordance with the process of the present invention may be mentioned any type of inorganic acid such as hydrochloric acid, hydrobromic acid, hydriodic acid, etc. sulfuric acid, phosphoric acid, nitric acid, and the halogens including chlorine, bromine, and iodine, nitrogen oxides, etc. Reactions between highly corrosive substances have been successively conducted at pressures up to 500 atmospheres and at temperatures of 500° C. and higher.

I claim as my invention:

1. A vessel for containing fluids, which comprises in combination, an outer shell, an inner shell and a capillary connecting the space between said shells with the space within said inner shell.

2. A vessel for containing fluids under conditions other than atmospheric which comprises in combination an outer shell reactive to a fluid contained within the vessel and capable of withstanding the non-atmospheric conditions employed therein, a non-reactive inner shell containing said reactive fluid and protecting the outer shell from contact therewith, and a capillary connecting the space between said shells with the space within said inner shell to equalize the pressure conditions within said spaces.

3. A vessel for containing fluids at superatmospheric pressure, which comprises in combination an outer shell reactive to a fluid contained within the vessel and capable of withstanding the superatmospheric pressure employed therein, a more fragile non-reactive inner shell containing the fluid, and a capillary connecting the space between said shells with the space within the inner shell.

4. A vessel for retaining corrosive liquids and non-corrosive vapors at superatmospheric pressure, comprising a non-corrosive liner within said vessel for preventing contact between the corrosive liquid and the walls of the vessel and a capillary connecting the vapor space in said liner with the space between the liner and the walls of the vessel whereby the pressure in the space between the liner and the walls of the vessel is equalized with that within the liner.

5. A vessel for containing fluids, which comprises in combination, an outer shell reactive to a fluid contained within the vessel, a non-reactive inner shell containing said reactive fluid, a capillary connecting the space between said shells with the space within the inner shell and means for introducing a fluid non-reactive with both shells into the space between the inner and outer shells.

6. A vessel for containing fluids undergoing reaction, which comprises in combination an outer shell reactive to a fluid contained within the vessel, a non-reactive inner shell containing said reactive fluid, a capillary connecting the space between the shells with the space within the inner shell, means for introducing fluid to the inner shell and for removing reaction products from the inner shell and means for supplying a fluid non-reactive to both shells to the space between the inner and outer shells.

7. A vessel for containing fluids undergoing reaction at superatmospheric pressure, which comprises in combination an outer shell reactive to a fluid contained within the vessel and capable of withstanding the superatmospheric pressure employed therein, a more fragile non-reactive inner shell containing said reactive fluid, means for introducing fluid to the inner shell and for removing reaction products from the inner shell, means for supplying a fluid non-reactive to both shells to the space between the inner and outer shells, and a capillary connecting the space between the shells with the space within the inner shell for equalizing the pressure in said spaces.

8. A vessel for containing fluids undergoing reaction at superatmospheric pressure, which comprises in combination an outer shell reactive to a fluid contained within the vessel and capable of withstanding the superatmospheric pressure employed therein, a more fragile non-reactive inner shell containing said reactive fluid, means for introducing fluid to the inner shell and for removing reaction products from the inner shell, means for supplying a fluid non-reactive to both shells to the space between the inner and outer shells at superatmospheric pressure, and a capillary connecting the space between the shells with the space within the inner shell for equalizing the pressure in said spaces.

9. A vessel wherein corrosive liquids are treated at elevated temperatures and superatmospheric pressures and wherein non-corrosive vapors are evolved which comprises in combination a corrosive outer shell capable of withstanding the temperature and pressure conditions employed within the vessel, a more fragile non-corrosive inner shell, means for supplying the liquid to be treated to the inner shell and for removing reaction products from the inner shell and a capillary connecting the space between the shells with the vapor space within the inner shell.

10. A reaction vessel for operation at elevated temperatures and superatmospheric pressures which comprises in combination, an outer shell reactive to a fluid contained within the vessel and capable of withstanding the temperature and pressure conditions employed therein, a more fragile non-reactive inner shell, means for supplying the fluid to be treated to the inner shell and for removing reaction products from the inner shell, a capillary connecting the space between the shells with the space within the inner shell, and means for supplying a fluid, non-reactive to both shells and of corresponding vapor pressure to the fluid undergoing treatment, to the space between the inner and outer shells.

11. A reaction vessel for operation at elevated temperatures and superatmospheric pressures, which comprises in combination an outer shell reactive to a fluid contained within the vessel and capable of withstanding the temperature and pressure conditions employed therein, a more fragile non-reactive inner shell, means for supplying the fluid to be treated to the inner shell and for removing reaction products from the inner shell, a capillary connecting the space between the shells with the space within the inner shell, means for heating the vessel and means for supplying a fluid, non-reactive to both shells and of corresponding vapor pressure to the fluid undergoing treatment, to the space between the inner and outer shells.

ARISTID V. GROSSE.